United States Patent
Kumar et al.

(10) Patent No.: US 7,387,813 B2
(45) Date of Patent: Jun. 17, 2008

(54) METHODS OF PREPARATION OF HOLLOW MICROSTRUCTURES AND NANOSTRUCTURES

(75) Inventors: Rakesh Kumar, Carmel, IN (US); Bawa Singh, Voorhees, NJ (US); Brian G. Lewis, Branford, CT (US); Michael T. Marczi, Chester, NJ (US)

(73) Assignee: Specialty Coating Systems, Inc., Indianapolis, IN (US)

( * ) Notice: Subject to any disclaimer, the term of this patent is extended or adjusted under 35 U.S.C. 154(b) by 386 days.

(21) Appl. No.: 11/176,017

(22) Filed: Jul. 7, 2005

(65) Prior Publication Data

US 2007/0009738 A1    Jan. 11, 2007

(51) Int. Cl.
*B05D 3/02* (2006.01)
*B05D 3/10* (2006.01)
*C23C 8/02* (2006.01)
*B32B 5/16* (2006.01)
*C08F 2/36* (2006.01)

(52) U.S. Cl. ............. 427/227; 427/212; 427/487; 427/509; 427/532; 427/585; 428/402; 428/403

(58) Field of Classification Search ........... 427/212, 427/217, 221, 227, 487, 509, 532, 585; 428/402, 428/403
See application file for complete search history.

(56) References Cited

U.S. PATENT DOCUMENTS

| | | | |
|---|---|---|---|
| 4,221,186 A | 9/1980 | Woerner | |
| 4,303,736 A * | 12/1981 | Torobin | 428/403 |
| 4,381,963 A | 5/1983 | Goldstein et al. | |
| 4,508,760 A | 4/1985 | Olson et al. | |
| 4,782,097 A * | 11/1988 | Jain et al. | 521/56 |
| 5,069,972 A | 12/1991 | Versic | |
| 5,094,906 A | 3/1992 | Witzke et al. | |
| 5,288,504 A | 2/1994 | Versic | |
| 5,298,298 A | 3/1994 | Hoffman | |
| 5,352,512 A | 10/1994 | Hoffman | |
| 5,512,330 A * | 4/1996 | Dearnaley | 427/525 |
| 5,658,515 A | 8/1997 | Lee et al. | |
| 6,194,066 B1 | 2/2001 | Hoffman | |
| 6,464,740 B1 | 10/2002 | Towery et al. | |
| 6,485,406 B1 | 11/2002 | Ziegler et al. | |
| 6,549,327 B2 | 4/2003 | Foucher et al. | |
| 6,559,474 B1 | 5/2003 | Craighead et al. | |
| 6,602,932 B2 | 8/2003 | Feldheim et al. | |

(Continued)

FOREIGN PATENT DOCUMENTS

DE    28 23 521 A1    12/1979

(Continued)

OTHER PUBLICATIONS

Wang et al., "Wetting and Electrowetting Properties of Carbon Nanotube Templated Parylene Films", J. Phys. Chem. B, vol. 111, No. 17, 2007, pp. 4296-4299.*

*Primary Examiner*—H. T Le
(74) *Attorney, Agent, or Firm*—Lowrie, Lando & Anastasi, LLP

(57) ABSTRACT

Structures in the nanoscale and mesoscale domain are provided. The structures typically have a shell which can be comprised of a porous polymeric material such as parylene. The surfaces of the shell can further comprise pendant functional groups that can provide reactive or passive characteristics.

9 Claims, 3 Drawing Sheets

U.S. PATENT DOCUMENTS

| | | | |
|---|---|---|---|
| 6,667,099 B1 | 12/2003 | Greiner et al. | |
| 6,692,680 B2 | 2/2004 | Lee et al. | |
| 6,720,007 B2 * | 4/2004 | Walt et al. | 424/489 |
| 6,723,143 B2 | 4/2004 | Towery et al. | |
| 6,913,825 B2 * | 7/2005 | Ostafin et al. | 428/402 |
| 7,094,369 B2 * | 8/2006 | Buiser et al. | 264/7 |
| 2003/0005647 A1 | 1/2003 | Towery et al. | |
| 2003/0028071 A1 | 2/2003 | Handy et al. | |
| 2003/0040173 A1 | 2/2003 | Fonash et al. | |
| 2003/0165613 A1 | 9/2003 | Chappa et al. | |
| 2003/0165951 A1 | 9/2003 | Bruchez et al. | |
| 2003/0180965 A1 | 9/2003 | Yobas et al. | |
| 2003/0208888 A1 | 11/2003 | Fearing et al. | |
| 2003/0228411 A1 | 12/2003 | Tai et al. | |
| 2004/0121486 A1 | 6/2004 | Maloney et al. | |

FOREIGN PATENT DOCUMENTS

| | | |
|---|---|---|
| EP | 0 195 353 | 9/1986 |
| EP | 0 721 176 B1 | 10/1999 |
| EP | 1 008 995 A1 | 6/2000 |
| EP | 1 262 817 A1 | 12/2002 |
| EP | 0 996 130 B1 | 5/2004 |
| FR | 1 511 581 | 12/1966 |
| JP | 62-110916 | 5/1987 |
| WO | WO 90/02604 A1 | 3/1990 |
| WO | WO 97/26225 | 7/1997 |
| WO | WO 98/21587 A1 | 5/1998 |
| WO | WO 99/18893 | 4/1999 |
| WO | WO 03/020946 A2 | 3/2003 |
| WO | WO 03/055611 A1 | 7/2003 |
| WO | WO 03/066933 A1 | 8/2003 |
| WO | WO 2004/015018 A1 | 2/2004 |
| WO | WO 2004/065295 A1 | 8/2004 |

* cited by examiner

METHODS OF PREPARATION OF HOLLOW MICROSTRUCTURES AND NANOSTRUCTURES

BACKGROUND OF INVENTION

1. Field of Invention

This invention relates to nanoscale and mesoscale structures and methods of preparation and use thereof and, in particular, to nanoscale and mesoscale spherically-shaped hollow spheres.

2. Discussion of Related Art

Goldstein et al., in U.S. Pat. No. 4,381,963, disclose a microfabrication molding process.

Olson et al., in U.S. Pat. No. 4,508,760, disclose a method and apparatus for microencapsulation.

Versic, in U.S. Pat. No. 5,069,973, discloses a moldable microcapsule that contains a high percentage of solid core material, and method of manufacture thereof.

Witzke et al., in U.S. Pat. No. 5,094,906, disclose ceramic microtubular materials and methods of making same.

Versic, in U.S. Pat. No. 5,288,504, discloses pharmaceuticals microencapsulated by vapor deposited polymers.

Hoffman, in U.S. Pat. Nos. 5,298,298, 5,352,512, and 6,194,066, discloses microscopic tube material and method of their manufacture.

Craighead et al., in U.S. Pat. No. 6,559,474, disclose a method for topographical patterning of materials.

Feldheim et al., in U.S. Pat. No. 6,602,932, disclose nanoparticle composites and nanocapsules for guest encapsulation and method for synthesizing same.

Greiner et al., in U.S. Pat. No. 6,667,099, disclose meso- and nanotubes.

Rennebeck, in International Publication No. WO 97/26225 discloses hollow microfibers of ceramic material and a process for its manufacture and its use.

Laurencin, et al., in International Publication No. WO 99/18893, disclose hybrid nanofibril matrices for use as tissue engineering devices.

SUMMARY OF THE INVENTION

In accordance with one or more embodiments, the invention relates to a spherical body having an outer diameter of less than about 125 μm and comprising a monolithic, polymeric shell enclosing a cavity.

In accordance with one or more embodiments, the invention relates to a method of preparing spherically-shaped body having a porous, monolithic shell comprising acts of providing a spherically-shaped particle having an outer diameter of less than about 100 μm, depositing a polymeric precursor material on a surface of the spherically-shaped particle, polymerizing the precursor material to produce the porous, monolithic shell, and removing the spherically-shaped particle resulting in a cavity defined by the porous, monolithic shell.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
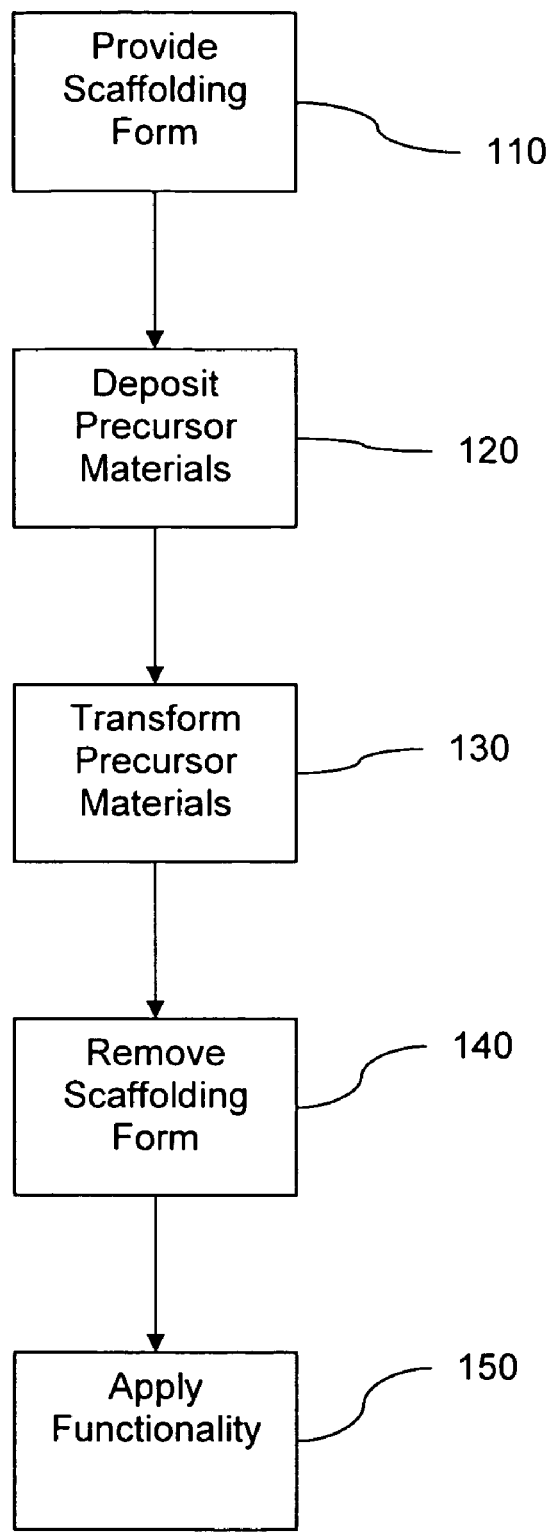
FIG. 1 is a chart showing acts directed at preparing nanoscale and mesoscale structures in accordance with one or more embodiments of the invention.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to the claims.

This invention is not limited in its application to the details of construction and the arrangement of components set forth in the following description or illustrated in the drawings. The invention is capable of embodiments and of being practiced or of being carried out in various ways beyond those exemplarily presented herein.

The structures or bodies of the invention can have any desired outer dimension in the nanoscale or mesoscale domain. In some cases, the outer dimension can be predetermined and/or dictated by a particular end use or application. For example, where a particular outer dimension of a spherically-shaped body is desired, the systems and techniques of the invention can provide a structure or body having a target outer dimension.

Nanoscale structures are those having a dimension, at least one relevant dimension, of about 0.5 μm to about 50 nm. Mesoscale structures are those having a dimension of about 50 nm to about 100 μm. Indeed, the nanoscale or mesoscale structures of the invention can have an outer dimension of less than about 100 nm. In accordance with one or more particular embodiments of the invention, a shell of the nanoscale or mesoscale structures of the invention can have an outer dimension of less than about 50 μm, in other cases, less than about 1 μm, and in still other cases, less than about 100 nm.

In accordance with one or more particular embodiments, the structure or body of the invention can have an outer dimension of less than about 125 μm. Where appropriate for a particular application, or as desired, the structure can have an outer dimension of less than about 50 μm. In some cases, the outer dimension can be less than about 100 nm and, in still other cases, the outer dimension is less than about 10 nm. The outer dimension can be an average diameter or an effective diameter pertinent to the end use application or service. For example, the effective diameter can be a hydrodynamic diameter that characterizes the hydrodynamic nature of the nanoscale or mesoscale structure or body in a fluid or medium.

The invention further provides systems and techniques directed at fabricating or producing nanoscale and/or mesoscale structures as well as to systems and techniques directed at uses of such structures.

The structures of the invention can have any desired shape. Typically, the structures of the invention are closed, without an aperture or opening which would provide indiscriminant direct communication between an enclosed, interior volume of the structure and an outside, exterior volume or space. Thus, in accordance with one or more particular embodiments, the invention provides spherically-shaped, closed structures or bodies defined by a shell that can limit physical, chemical, and/or electrochemical, interaction between an interior volume or cavity of the structure and an exterior environment thereof. However, other closed, non open-ended structures are contemplated by the systems, articles, and/or techniques of the invention. For example, conically- and frustoconically-shaped bodies as well as structures having toroidal and ellipsoidal configurations, and combinations thereof, can be pertinent to certain aspects of the invention. Indeed, in accordance with some aspects, asymmetrical structures are pertinent to one or more embodiments of the invention whereas further aspects of the invention can be directed to structures or bodies having one or more symmetrical attributes. For example, the structures can be symmetrical about a point, providing a substantially spherical shape, or can be symmetrical about a straight or curved line segment, providing a cylindrical shape. In accordance with further embodiments of the invention, two or more structures can form one or more aggregates. The aggregation of the structures can comprise a plurality of such structures, and, in some cases, one or more kinds of structures, sizes, and/or shapes can comprise the aggregation. The structures of the aggregation can be magnetically, chemically, electrochemically, and/or electrically linked. For example, two or more structures of an aggregation can be chemically joined through one or more chemical linkages, such as a polymer chain.

The shell of one or more structures of the invention can have one or a plurality of layers. Layers are typically represented by uniformity in chemical composition, substantially throughout the particular layer. Other aspects pertaining to each layer relates to a lack of an interface defining a change in chemical composition, in crystallinity, and/or in a change in material density but not necessarily a change in thickness. Thus, for example, each layer of the shell can have a varying thickness and be comprised of the same material.

The shell of the structures of the invention can have any desired thickness that provides a desired physical, chemical, and/or biological effect or characteristic. The shell, which can comprise one or more layers, can have an average thickness that provides, depending on other factors, a desired or target transport rate of a species between an interior volume and an exterior environment of the nanoscale or mesoscale structure. For example, the shell can have a thickness, which can be represented as an average thickness or, in some cases as a minimum thickness, of less than about 25 µm, The shell can be monolithic thereby having no seams or joints that serve as features or provide indicia of discontinuity. In particular, each of the one or more layers can be monolithic. The monolithic nature of the shell or at least one layer thereof, prevents indiscriminant communication between the exterior volume from the interior volume. In accordance with one or more aspects pertaining to one or more embodiments of the invention, each or at least one of the one or more layers comprising the shell can be porous, or at least partially porous, that can selectively permit the transport of one or more species therethrough. In accordance with still further aspects of some embodiments of the invention, the structure can comprise a shell having a first layer that is selectively porous to inhibit transport therethrough of a particular species and at least one layer that inhibit transport therethrough of a second particular species. In accordance with other aspects relevant to one or more alternative embodiments of the invention, the first layer of the shell can selectively permit one or more genus of compounds and can further comprise one or more layers that selectively permit the transport therethrough of a particular species within the genus.

The shell can comprise any material that provides one or more desired properties. For example, the shell or at least one layer thereof can comprise a polymeric material. In some cases, the shell comprises a porous material, such as porous polymer or polymeric, typically organic, network. The polymeric material can be thermosetting, thermoplastic, or a mixture thereof. In some cases, the polymeric material can be formed as a cross-linked network. In accordance with further embodiments of the invention, the structures of the invention can be comprised of a chemically and/or biologically inert material. For example, one or more structures of the invention can comprise a biologically inert material that is not metabolized or toxic, or decomposes or degrades, to provide substituents that are biologically metabolizable, or at concentrations that are toxic to biological processes. However, other embodiments of the invention provide one or more structures that can decompose to products that are ubiquitous in a biological environment. For example, the shell can comprise parylene in one or more layers. Any one or more suitable grades or variants of parylene compounds can be utilized in the invention. Examples of grades or types of parylene include, but are not limited to, PARYLENE HT™, parylene C, parylene N, and, in some cases, parylene D.

In accordance with one or more embodiments of the invention, the shell can comprise one or more coatings on at least a portion of a surface thereof. In accordance with further embodiments of the invention, the one or more coatings can comprise a plurality of moieties having one or more functional groups. For example, a first coating can comprise a first or first mixture of moieties, in a first region or area of the shell surface, and can further comprise a second coating in a second region, of the shell surface, which can be proximate but not necessarily adjacent to the first region. The one or more coatings can render or provide the shell, at least partially, with a functionality or property that affects the chemical and/or physical behavior of the nanoscaled or mesoscaled structure. Thus, for example, a coating on an external surface of the structure of the invention can comprise a functionality that is hydrophilic, hydrophobic, or lipophilic, thus imparting such character on at least a portion of the shell.

In accordance with some of embodiments of the invention, the structures can comprise a coating, having one or more layers, of a metal or alloys or mixtures thereof. Indeed, the mesoscale or nanoscale structures can be rendered non-porous by depositing one or more layers of a non-porous material. Thus, for example, the mesoscale or nanoscale structures can comprise one or more coatings of precious metals, transition metals, valve metals, and/or platinum group metals or mixtures, oxides, nitrides, and/or carbides thereof. Further or additional functionalities can be disposed on at least a portion of the structures following metal coating operations.

Metal or non-porous material deposition can be performed by any suitable technique. For example, the structures can be exposed, such as by spraying or immersion, to one or more solutions comprising one or more metal salts. The metal salts can further be converted to oxide, carbide, and/or nitride analogues by promoting the corresponding reaction. Other techniques such as vapor deposition, electrolysis, including electroless processes, can also be utilized.

In accordance with further embodiments of the invention, the coating can comprise a functional group that has a paramagnetic and/or conductive, electrically or ionically, nature. Thus, the one or more functional groups can provide or promote selective effects that can modify or promote a particular or desired behavior on the structures of the invention with respect to neighboring structures and/or with respect to its environment. For example, the structures of the invention can be coated with one or more hydrophobic functional groups, such as lipids or hydrocarbons. The functional groups can thus effect or promote the nanoscaled or mesoscaled structures to exhibit a desired or particular behavior. For example, the functionality can have a hydrophobic nature that promotes self-assembly of the nanoscale or mesoscale structures when disposed in an aqueous environment.

In accordance with further aspects of the invention, the coating can render the shell chemically inert, at least partially, with respect to one or more reactive species. For example, at least a portion of the coating can comprise one or more pendant moieties that comprise a functional group selected from the group consisting of a hydroxyl, a carboxyl or carboxylic acid, a sulfonyl, an amide, an amine, and mixtures of combinations thereof. Other aspects of the invention are further directed to one or more coatings that can promote a selective affinity for one or more target species. For example, the one or more coatings can comprise one or more ligands or chelatable functional groups that reversibly, or irreversibly, binds one or more metal, or metal ions, or species. Examples of chelating functionalities include, but are not limited to, those based on imidodiacetate, ethylenediamine, porphyrin such as porphine, ethylenediaminetetraacetic acid, dimercaprol (2,3-dimercapto-1-propanol), and other multi-dentate ligands that can form two or more bonds to precious and/or transition metals, or ionic variants thereof.

The various structures of the invention can be prepared by utilizing any suitable technique that facilitates the formation of such structures at the desired size or range of sizes. As exemplarily shown in FIG. 1, the structures of the invention can be prepared by utilizing, providing 120, a scaffolding material, typically a particle or a collection of particles, having a desired shape factor that approximates a desired shape. The scaffolding material typically serves as a mold upon which a material can be deposited. The surface of such scaffolding blocks can be treated or be activated to promote situating and/or accumulation of the material to be deposited. Deposition 120 of the material to be deposited can be performed utilizing any suitable technique that provides a desired amount on the surface of the scaffolding block. Deposition can be facilitated by utilizing one or more carriers that aid in the delivery and placement of the material. For example, deposition operations can be facilitated by utilizing a solvent as a carrier for the material to be deposited and applying the mixture onto the surface of the scaffolding material. Other techniques that can be utilized to effect deposition include, but are not limited to solvent-free and/or catalyst processes, vapor deposition, spraying, plasma, colloidal precipitation, nebulization or ultrasonic, and spinning, such as electro-spinning, techniques. For example, vapor deposition polymerization techniques can be utilized by sublimating a vapor, such as one formed by heating dry, powdered, or liquid starting or precursor materials. With respect to embodiments pertinent to parylene, for example, precursor materials can be referred to as dimers. Deposition can be performed at any suitable temperature and pressure that promotes the deposition process. For example, vapor deposition of the dimer can be performed under a vacuum at room temperature. Commercially available precursors include, for example, those available as DPXC, DPXN, and PARYLENE HT™, each of which is available from Specialty Coating Systems, Indianapolis, Ind.

The deposited material, or precursor material, can then be treated 130 to change, at least partially, its physical properties so that a permanent, or at least semi-permanent, transformation provides a stable layer of deposited material. Typically, the change of the deposited material affects at least one physical property. For example, the treatment can transform the deposited, precursor material to a solvent resistant material. In some cases, transformation of the precursor material effects a change is the characteristics of the precursor material to a mechanically, chemically, electrically, and/or biologically stable or inert composition. Thus, for example, treating the deposited precursor material can comprise initiating or effecting a chemical reaction that changes the viscosity of the precursor material. In accordance with one or more particular embodiments of the invention, one or more treating techniques can comprise polymerizing or promoting the formation of cross-links in the precursor material. In some cases, however, the deposition can further provide conversion of the precursor material into inert stable compositions. For example, vapor deposition polymerization can effect deposition of dimers and conversion by polymerization to form a shell having at least one layer comprising parylene. Thus, some techniques advantageously provide simplified processes resulting in chemically and/or biologically inert structures.

Any suitable scaffolding material can be utilized to provide a template upon which the structures of the invention can be fabricated. Typically the scaffolding materials are selected relative to the material comprising shell. In accordance with one or more particular embodiments of the invention, the shell can comprise a porous material such that the scaffolding materials can be changed to a state or form that can transport through the shell. For example, the scaffolding material can comprise a material that can be dissolved in a solvent, preferably a solvent that readily transpires or transports through the shell. In accordance with further embodiments, the scaffolding material can transpire through the porous shell. For example, the scaffolding can comprise a soluble and/or vaporizable material that can diffuse through the one or more layers comprising the shell of the nanoscale or mesoscale structures. The soluble materials can be soluble in aqueous or hydrocarbon-based media such as, but not limited to water, alcohols, including glycols, as well as oils, ethers, ketones, and other organic solvents. For example, the scaffolding can comprise a carbohydrate such as a sugar that can dissolve and transpire through parylene, while in an aqueous solution. Other techniques directed at removing 140 the scaffolding or otherwise effecting evacuation of the scaffolding material from within the enclosed volume of the shell can be utilized. For example, techniques that promote a phase change, such as liquefying or vaporizing, the scaffolding material can be utilized. Thus, directing energy, such as, but not limited to, light or other electromagnetic radiation, and/or heat, on the scaffolding material can be utilized in the techniques of the invention.

Further and in accordance with one or more embodiments of the invention, the scaffolding material can comprise a material having a solid phase at a first or first set of conditions, such as at conditions conducive to vapor deposition polymerization processes, and a non-solid, vapor or liquid, phase at a second or other set of conditions. Thus, deposition and/or transformation processes can be performed at the first set of conditions on a solid scaffolding material to form a stable shell. Upon completion thereof, the structures can be exposed to a second set of conditions that promote a phase change of the scaffolding material to a state that can transpire through the shell. For example, the scaffolding material can comprise water which can be in a solid state, as ice crystals, at a first set of conditions, and can be a liquid, or vapor, state at a second set of conditions. In the vaporized or liquefied state, the scaffolding material can transpire through the stable shell. Thus, one or more methods or techniques of the invention can further comprise one or more acts pertinent to removing scaffolding materials, such as the spherically-shaped particle, and/or to providing a cavity defined by the porous, monolithic shell by, for example, exposing the structures to conditions that promote removal of the one or more scaffolding materials.

The structures of the invention can further be responsive to one or more external conditions that at least partially alters at least one property thereof. For example, one or more layers can exhibit impermeable properties at a first condition and also be selectively permeable at one or more other conditions. Non-limiting examples of such first and/or alternative conditions can include the temperature and/or pH of and/or the presence or absence of one or more species in the environment and/or the presence or absence of a magnetic or electric field. Thus, in accordance with one or more embodiments, the invention provides nanoscaled and mesoscaled structures that can serve as capsule that can trap, and, in some cases selectively release, the one or more species.

Functionalization 150 of the one or more surfaces, or at least portions of the one or more surfaces, can be effected through any technique. Functionalization can comprise one or more acts directed at rendering at least a portion of the surface as non-porous or at least semi-permeable. Non-limiting examples of such techniques include, but are not limited to, electrodeposition, chemical and physical vapor phase deposition, copolymerization, plasma grafting, gas phase, and/or liquid phase substitution reactions, or combinations thereof. The optional deposition or application 150 of one or more functional groups can be performed before, during, or after the scaffold material removal.

The structures of the invention can have one or more uses or be utilized in one or more applications. The structures of the invention can impart or alter electrical, chemical, or other physical properties of an assembly. For example, the structures of the invention can facilitate, serve as or be utilized as components of ultracapacitors, active and passive thermal management systems, electromagnetic shielding materials, radiation dosimeters, drug delivery (time release) capsules, catalysts, textiles, including providing lightweight insulative characteristics, membranes, rheological modifiers, purification systems, displays, separation systems, and/or filtration systems directed at gaseous, bacterial, and viral targets. The structures of the invention can also be utilized in ion exchange, dialysis, and desalination operations as well as in sensor technology and electrochemical devices.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

This example describes the preparation of mesoscaled structures in accordance with one or more embodiments of the invention.

Scaffolding materials were prepared to be rod-shaped by hot-melting sugar (sucrose). The sucrose granules were heated between to a temperature in a range of about 185° to about 220° C. until the granules were transformed into a liquid state. The hot-melted sugar was spun at a rate in a range of about 1,000 to about 3,000 rpm to create fine solid fiber structures in a cotton candy machine. The spun solid fiber structures were allowed to cool to about room temperature.

The formed scaffolding materials were then coated by vapor phase deposition utilizing a Model PDS 2010 LAB-COTER® 2, available from Specialty Coating Systems, Indianapolis, Ind., of a parylene precursor, dimer (DPXC) to create a polymeric layer of parylene. Vaporization was performed at a temperature of about 150° C. at a pressure of about 1 torr. Pyrolization was performed at a temperature of about 680° C. at a pressure of about 0.5 torr. Deposition was performed at a temperature of about 25° C. with a chamber vacuum pressure of about 0.1 torr.

Following vapor phase coating, the samples were exposed to hot water at near boiling point, having a temperature in a range of about 80° to about 90° C. The hot water solvent was replaced every about twelve hours. After about four days, the mesoscaled structures were dried under vacuum, of about −25 psi, in an oven at a temperature of about 60° C.

Figure 2:
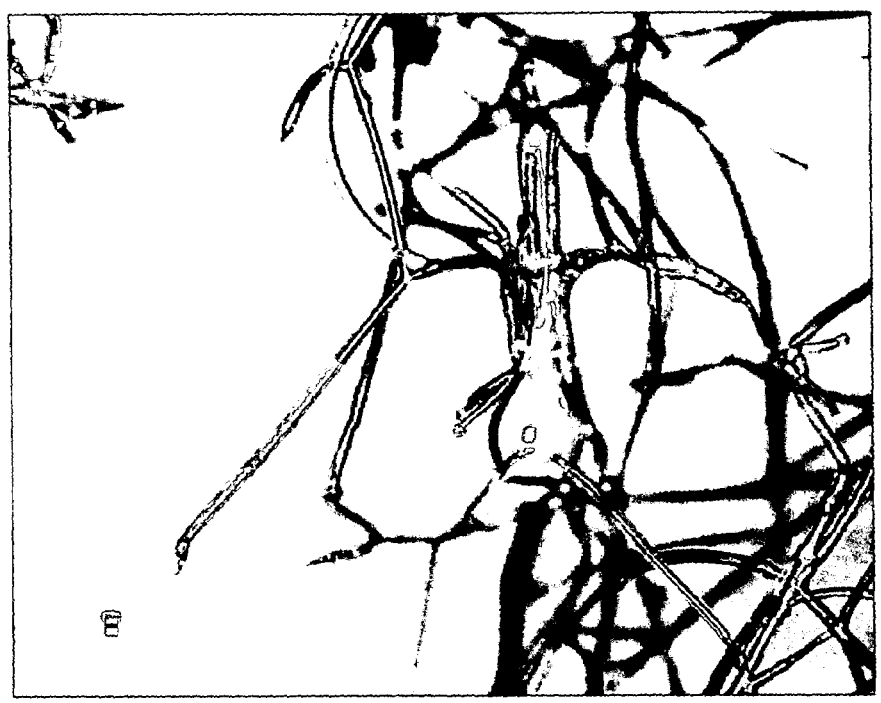
FIG. 2 is a copy of a photomicrograph showing mesoscale structures in accordance with one or more embodiments of the invention.

FIG. 2 is a copy of a photomicrograph showing resultant mesoscale tube structures.

Example 2

This example describes the preparation of nanoscale structures in accordance with one or more embodiments of the invention.

Scaffolding materials were prepared to be substantially spherically-shaped by hot-melting sucrose as substantially described in Example 1. The formed scaffolding materials were then coated by vapor phase deposition of dimer material (DPXC) to create a polymeric layer of parylene also as substantially described in Example 1.

Following coating, the sucrose scaffolding materials were removed from the structures by dissolution as substantially described in Example 1.

Figure 3B:
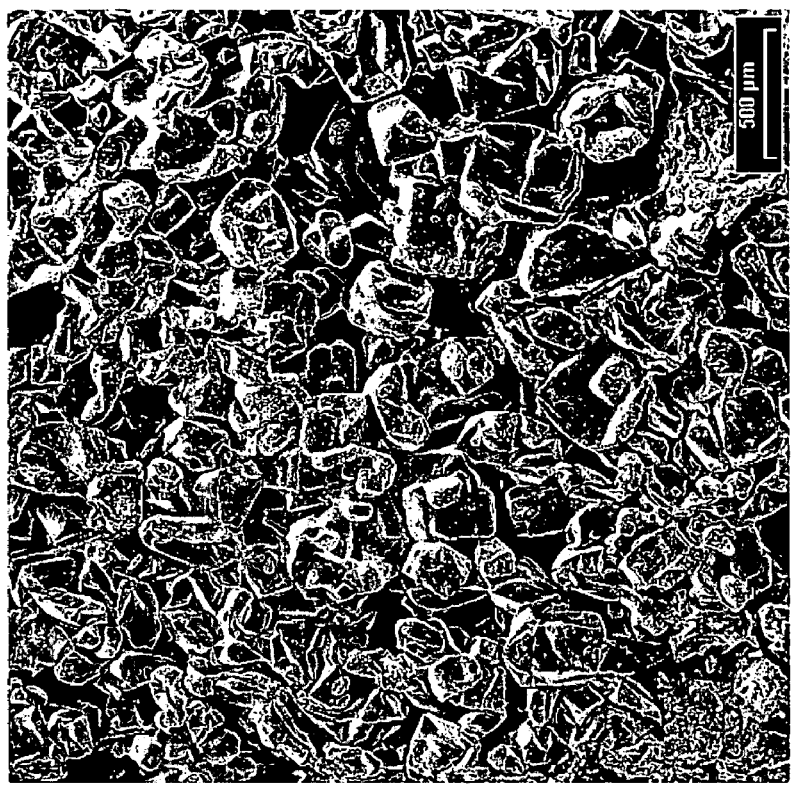
FIGS. 3A and 3B are copies of photomicrographs showing nanoscale structures in accordance with one or more embodiments of the invention.
Figure 3A:

FIGS. 3A and 3B are copies of photomicrographs showing the resultant spherical structures.

Example 3

This example describes the functionalization of structures in accordance with one or more embodiments of the invention.

Scaffolding materials were prepared by hot-melting sucrose as substantially described in Example 1. The formed scaffolding materials were then coated by vapor phase deposition of dimer material (DPXC) to create a polymeric layer of parylene also as substantially described in Example 1. Following coating, the sucrose scaffolding materials were removed from the nanoscale structures by dissolution as substantially described in Example 1.

Copper was deposited on the outer surface of the structures by utilizing electroless copper coating techniques to produce a copper layer with a thickness of about 0.2 to about 0.3 mm.

Figure 4:
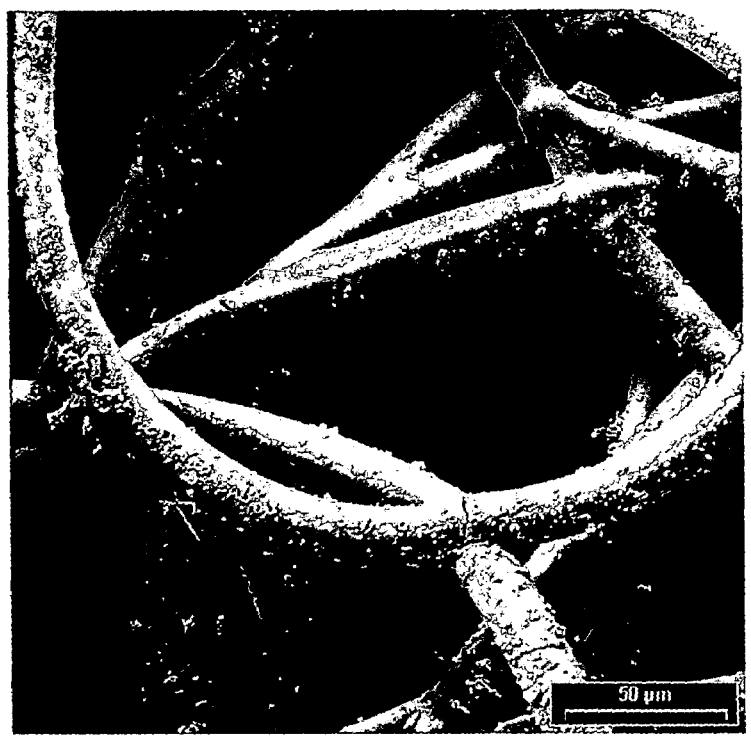
FIG. 4 is a copy of a photomicrograph showing functionalized structures in accordance with one or more embodiments of the invention.

FIG. 4 is a copy of a photomicrograph showing the copper-coated structures.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Further, acts, elements, and features discussed only in connection with one embodiment are not intended to be excluded from a similar role in other embodiments.

It is to be appreciated that various alterations, modifications, and improvements can readily occur to those skilled in the art and that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. A method of preparing a spherically-shaped body having a parylene shell comprising acts of:
providing a spherically-shaped scaffolding material having an outer diameter of less than about 100 μm;
depositing a parylene precursor material on a surface of the spherically-shaped scaffolding material;
polymerizing the parylene precursor material to produce the parylene shell; and
removing the spherically-shaped scaffolding material resulting in a cavity defined by the parylene shell.

2. The method of claim 1, further comprising disposing, on at least a portion of at least one surface of the parylene shell, at least one chemical moiety.

3. The method of claim 2, wherein the at least one chemical moiety comprises at least one functional group selected from the group consisting of a hydroxyl, a carboxylic acid, an amide, an amine, and a chelate.

4. The method of claim 3, wherein the act of depositing the parylene precursor material is performed until a sufficient amount thereof polymerizes to result in the parylene shell having a thickness of less than about 25 μm.

5. The method of claim 1, wherein the parylene shell has an average outer diameter of less than about 125 μm.

6. The method of claim 1, wherein the act of removing the spherically-shaped scaffolding material comprises dissolving the spherically-shaped scaffolding material in a solvent.

7. The method of claim 1, wherein the act of removing the spherically-shaped scaffolding material comprises vaporizing the spherically-shaped scaffolding material.

8. The method of claim 1, wherein the act of depositing the parylene precursor material comprises vapor-phase deposition of the parylene precursor material.

9. The method of claim 1, wherein the acts of depositing and polymerizing the parvlene precursor material are repeated to produce the parylene shell having a plurality of layers of parylene.

* * * * *